United States Patent
Kypri et al.

(10) Patent No.: US 10,311,749 B1
(45) Date of Patent: Jun. 4, 2019

(54) SAFETY SCORE BASED ON COMPLIANCE AND DRIVING

(71) Applicant: Lytx, Inc., San Diego, CA (US)

(72) Inventors: Niki Kypri, San Diego, CA (US);
Bryon Cook, San Diego, CA (US);
Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 158 days.

(21) Appl. No.: 14/025,699

(22) Filed: Sep. 12, 2013

(51) Int. Cl.
*G09B 19/16* (2006.01)
*G06Q 40/08* (2012.01)
*G06Q 40/00* (2012.01)
*G07C 5/00* (2006.01)

(52) U.S. Cl.
CPC ........... *G09B 19/167* (2013.01); *G06Q 40/00* (2013.01); *G06Q 40/08* (2013.01); *G09B 19/162* (2013.01); *G09B 19/165* (2013.01); *G07C 5/008* (2013.01)

(58) Field of Classification Search
CPC ....... G06Q 40/08; G06Q 40/00; B60W 40/09; G09B 19/165; G09B 19/167; G09B 19/162; G07C 5/008; G07C 5/02
USPC .......................................................... 434/66
See application file for complete search history.

(56) References Cited

U.S. PATENT DOCUMENTS

| | | | | |
|---|---|---|---|---|
| 5,919,244 A * | 7/1999 | Danz | ................... | F16H 61/0213 477/138 |
| 6,647,270 B1 * | 11/2003 | Himmelstein | ......... | G06Q 10/10 342/352 |
| 6,714,894 B1 * | 3/2004 | Tobey | ................... | G06Q 40/00 702/182 |
| 7,460,954 B2 * | 12/2008 | Hamrick | ............... | H04W 76/50 701/482 |
| 8,140,358 B1 * | 3/2012 | Ling et al. | ......................... | 705/4 |
| 8,595,034 B2 * | 11/2013 | Bauer et al. | ..................... | 705/4 |
| 8,606,492 B1 * | 12/2013 | Botnen | ......................... | 701/123 |
| 8,892,451 B2 * | 11/2014 | Everett et al. | .................... | 705/4 |
| 9,633,568 B2 * | 4/2017 | Mohn | ...................... | G09B 5/00 |
| 2001/0056544 A1 * | 12/2001 | Walker | ................... | B60R 25/02 726/2 |
| 2003/0130913 A1 * | 7/2003 | Ehrman | ................. | G06Q 10/00 705/28 |
| 2003/0187704 A1 * | 10/2003 | Hashiguchi | ........... | G06Q 40/02 705/4 |
| 2004/0039503 A1 * | 2/2004 | Doyle | .................... | G07C 5/085 701/32.6 |
| 2004/0039586 A1 * | 2/2004 | Garvey | ................. | G06Q 10/10 705/320 |
| 2004/0225557 A1 * | 11/2004 | Phelan et al. | ................... | 705/11 |
| 2004/0236596 A1 * | 11/2004 | Chowdhary | ....... | G06Q 30/0601 705/26.1 |
| 2005/0137757 A1 * | 6/2005 | Phelan et al. | ..................... | 701/1 |
| 2005/0171692 A1 * | 8/2005 | Hamblen | ................. | G08G 1/20 701/468 |

(Continued)

*Primary Examiner* — Robert J Utama
(74) *Attorney, Agent, or Firm* — Van Pelt, Yi & James LLP (57) ABSTRACT

A system for determining a safety score comprising an input interface and a processor. An input interface configured to receive compliance events from a database of compliance events and to receive detected driving events from a database of detected driving events. A processor configured to filter the compliance events and the detected driving events to generate a filtered list and to determine a safety score based at least in part on the filtered list.

19 Claims, 8 Drawing Sheets

(56) References Cited

U.S. PATENT DOCUMENTS

| | | | |
|---|---|---|---|
| 2006/0092043 A1* | 5/2006 | Lagassey | G07C 5/008 340/907 |
| 2007/0001831 A1* | 1/2007 | Raz | B60R 16/0231 340/439 |
| 2007/0027593 A1* | 2/2007 | Shah | B60W 50/00 701/29.4 |
| 2007/0088488 A1* | 4/2007 | Reeves | G07C 5/085 701/117 |
| 2007/0136078 A1* | 6/2007 | Plante | G06Q 10/00 348/148 |
| 2007/0257804 A1* | 11/2007 | Gunderson | G07C 5/0891 340/576 |
| 2007/0271105 A1* | 11/2007 | Gunderson | G06Q 10/087 705/1.1 |
| 2008/0255722 A1* | 10/2008 | McClellan | B60R 25/102 701/31.4 |
| 2008/0255869 A1* | 10/2008 | Young | G06Q 10/06 705/1.1 |
| 2008/0294690 A1* | 11/2008 | McClellan | G01S 5/0027 |
| 2010/0030586 A1* | 2/2010 | Taylor | G06Q 30/02 705/4 |
| 2010/0047744 A1* | 2/2010 | Miura | 434/66 |
| 2010/0191411 A1* | 7/2010 | Cook | G07C 5/085 701/31.4 |
| 2011/0307188 A1* | 12/2011 | Peng | G06Q 10/0639 702/33 |
| 2012/0146789 A1* | 6/2012 | De Luca | G08B 21/12 340/540 |
| 2012/0158436 A1* | 6/2012 | Bauer et al. | 705/4 |
| 2013/0073112 A1* | 3/2013 | Phelan et al. | 701/1 |
| 2013/0079971 A1* | 3/2013 | Raghunathan et al. | 701/31.4 |
| 2013/0289873 A1* | 10/2013 | Mitchell | G06F 17/00 701/482 |
| 2014/0080100 A1* | 3/2014 | Phelan et al. | 434/66 |
| 2016/0117928 A1* | 4/2016 | Hodges | G07C 5/008 701/99 |
| 2017/0166217 A1* | 6/2017 | Sbianchi | A61B 5/18 |

* cited by examiner

| Section | Violation Description | Violation Group Description | Violation Severity Weight | DriveCam Capture |
|---|---|---|---|---|
| 177.800(d) | Unnecessary delay in HM transportation to destination | HM Related | 1 | N |
| 177.804B | Failure to comply with 49 CFR 392.80 - Texting while Oper a CMV- Placardable HM | Texting | 10 | Y |
| 177.804C | Fail to comply with 392.82 - Using a Mobile Phone while Oper a CMV - HM | Phone Call | 10 | Y |
| 390.17DT | Operating a CMV while texting | Texting | 10 | Y |
| 390.20 | Failure to properly secure parked vehicle | Other Driver Violations | 1 | N |
| 392.2C | Failure to obey traffic control device | Dangerous Driving | 5 | Y |
| 392.2DH | Headlamps - Failing to dim when required | Misc Violations | 3 | N |
| 392.2FC | Following too close | Dangerous Driving | 5 | Y |
| 392.2LC | Improper lane change | Dangerous Driving | 5 | Y |
| 392.2LV | Lane Restriction violation | Misc Violations | 3 | N |
| 392.2P | Improper passing | Dangerous Driving | 5 | N |
| 392.2PK | Unlawfully parking and/or leaving vehicle in the roadway | Other Driver Violations | 1 | N |
| 392.2R | Reckless driving | Reckless Driving | 10 | Y |
| 392.2RR | Railroad Grade Crossing violation | Dangerous Driving | 5 | N |
| 392.2S | Speeding - Speeding 1-5 miles per hour over the speed limit | Speeding Related | 1 | Y |
| 392.2-SLLS2 | State/Local Laws - Speeding 6 - 10 miles per hour over the speed limit | Speeding 2 | 4 | Y |
| 392.2-SLLS3 | State/Local Laws - Speeding 11 - 14 miles per hour over the speed limit | Speeding 3 | 7 | Y |
| 392.2-SLLS4 | State/Local Laws - Speeding 15 or more miles per hour over the speed limit | Speeding 4 | 10 | Y |
| 392.2-SLLSSWZ | State/Local Laws - Speeding work/construction zone | Speeding 4 | 10 | N |
| 392.2-SLLT | State/Local Laws - Operating a CMV while texting | Texting | 10 | Y |
| 392.2T | Improper turns | Dangerous Driving | 5 | Y |
| 392.2Y | Failure to yield right of way | Dangerous Driving | 5 | Y |
| 392.6 | Scheduling run to necessitate speeding | Speeding Related | 5 | N |
| 392.10(a)(1) | Failing to stop at railroad crossing - bus | Dangerous Driving | 5 | Y |
| 392.10(a)(2) | Failing to stop at railroad crossing - chlorine | Dangerous Driving | 5 | Y |
| 392.10(a)(3) | Failing to stop at railroad crossing - placard | Dangerous Driving | 5 | Y |
| 392.10(a)(4) | Failing to stop at railroad crossing - Cargo Tank | Dangerous Driving | 5 | Y |
| 392.14 | Failing to use caution for hazardous condition | Dangerous Driving | 5 | Y |
| 392.22(a) | Failing to use hazard warning flashers | Other Driver Violations | 1 | N |
| 392.60(a) | Unauthorized passenger on board CMV | Other Driver Violations | 1 | Y |
| 392.62 | Unsafe bus operations | Other Driver Violations | 1 | Y |
| 392.62(a) | Bus - Standees forward of the standee line | Other Driver Violations | 1 | Y |
| 392.71(a) | Using or equipping a CMV with radar detector | Speeding Related | 5 | N |
| 392.80(a) | Driving a CMV while Texting | Texting | 10 | Y |
| 392.82(a)(1) | Using a hand-held mobile telephone while operating a CMV | Phone Call | 10 | Y |
| 392.82(a)(2) | Allowing or requiring driver to use a hand-held mobile telephone while operating a CMV | Phone Call | 10 | N |
| 397.3 | State/local laws ordinance regulations | HM Related | 1 | N |
| 397.13 | Smoking within 25 feet of HM vehicle | HM Related | 1 | N |
| 398.4 | Driving a vehicle to transport migrant workers in noncompliance with part 398 | Other Driver Violations | 1 | N |

SAFETY SCORE BASED ON COMPLIANCE AND DRIVING

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. An individual vehicle operator (e.g., a driver) can be associated with events that occurred while the operator operated the vehicle in order to establish a driver score. Driver scores can be used to rank drivers, identify unsafe drivers, identify drivers in need of coaching, etc.

BRIEF DESCRIPTION OF THE DRAWINGS

Various embodiments of the invention are disclosed in the following detailed description and the accompanying drawings.

FIG. 8 is a diagram illustrating an embodiment of a detected driving event weight table.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A safety score based on compliance and driving is disclosed. A system for determining a safety score comprises an input interface configured to receive compliance events from a database of compliance events; and to receive detected driving events from a database of detected driving events. The system for determining a safety score additionally comprises a processor configured to filter the compliance events and the detected driving events; and to determine a safety score based at least in part on the filtered compliance events and detected driving events. The system for passive driver identification additionally comprises a memory coupled to the processor and configured to provide the processor with instructions.

A vehicle event recorder mounted on a vehicle records anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. When anomalous vehicle events occur, sensors (video recorders, audio recorders, accelerometers, gyroscopes, vehicle state sensors, GPS, etc.) record anomalous vehicle event data associated with the event. The event is stored on the vehicle event recorder associated with the event data. Anomalous events are uploaded from the vehicle event recorder to a vehicle data server, where they are analyzed and stored in a database of detected driving events. A driver safety score can be determined directly from the detected driving events associated with a driver, however, the driver safety score can be improved by including other driver safety information in the driver safety score calculation. The vehicle data server additionally receives compliance events (e.g., citations, safety violations, accident reports, etc.) from a compliance event server, and stores the compliance events in a compliance event database. The driver safety score can then be determined based on detected driving events associated with the driver and on compliance events associated with the driver. In some embodiments, the detected driving events and the compliance events are filtered (e.g., to select events of a specific event type) and the driver safety score is determined based on the filtered compliance events and detected driving events. In some embodiments, a list of drivers ordered by safety score is produced. In some embodiments, a list of drivers with a safety score below a threshold is produced. In some embodiments, a list of drivers with a safety score indicating they should be coached is produced.

In some embodiments, a driver safety score based on compliance events and detected driving events comprises a correlation between compliance events and detected driving events (e.g., a driver safety score would indicate increased risk of collision probability in the event that a driver has a history of receiving vehicle inspection violations). In some embodiments, a driver safety score can be used to predict future compliance events based on received detected driving events. In some embodiments, a driver score can be used to predict serious future compliance events based on less serious received detected driving events (e.g., the capture of less risky driving behaviors like eating while driving is correlated with higher incidence of compliance fine, the capture of more risky behavior like texting while driving is correlated with higher incidence of compliance fine, etc.). In various embodiments, risky driving behaviors comprise one or more of the following: speeding, reckless driving, cell phone use, texting, food and/or drink distractions, passenger distractions, non-cell phone electronic device distractions, not recognizing traffic conditions ahead, not properly scanning an intersection or roadway, not checking mirrors, following too close to a lead vehicle, falling asleep, drowsy driving, aggressive driving, failure to obey a traffic control device (e.g., stop light, stop sign), or any other appropriate behaviors. In various embodiments, risky driving behaviors comprise risky driving maneuvers—for example, one or more of the following: hard braking, negotiating a corner or curve too fast, or rapid acceleration, or any other appropriate behaviors.

Figure 1:
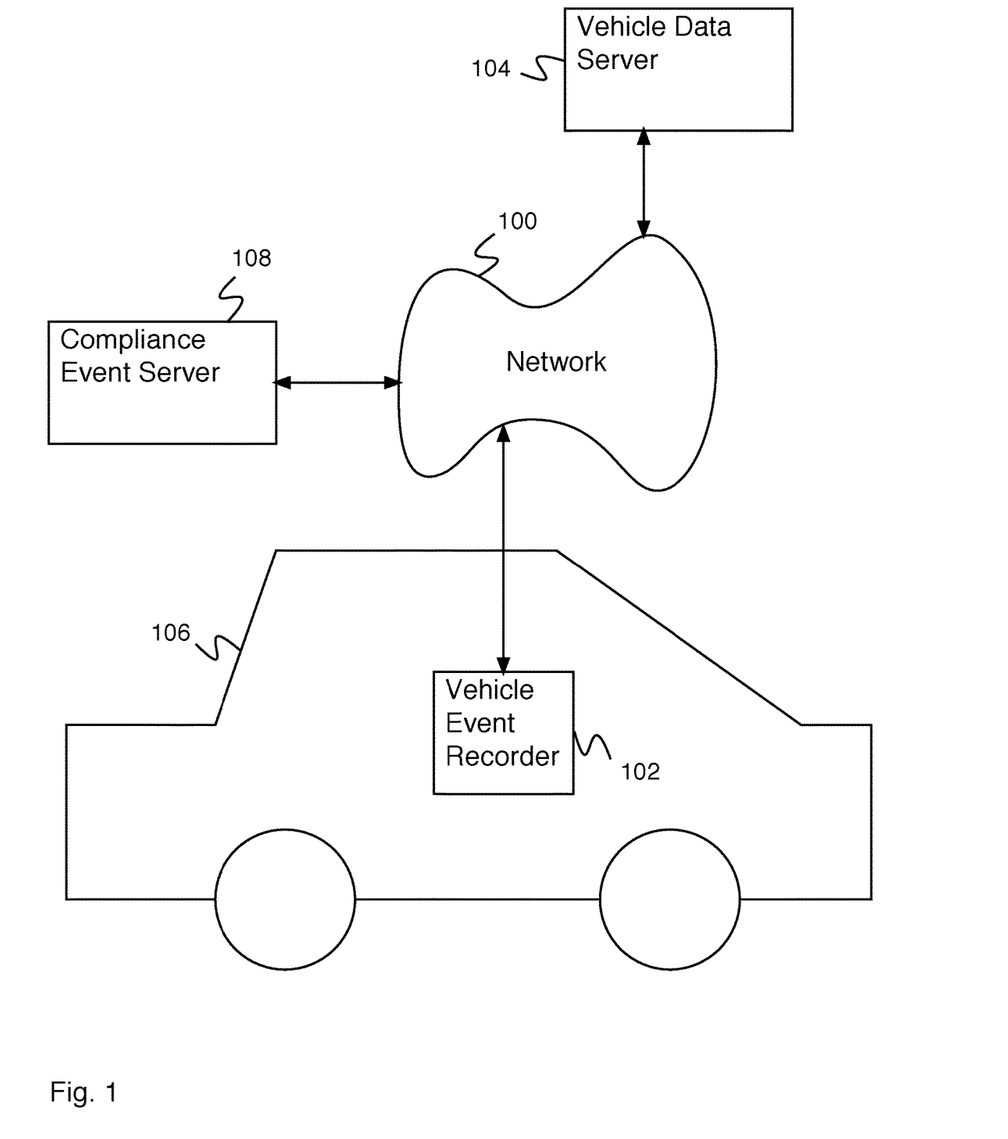
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an antilocking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Compliance event server 108 comprises a compliance event server for storing and providing compliance event data. In some embodiments, compliance event server 108 comprises a compliance event server provided by a compliance agency (e.g., a government agency, e.g., the Federal Motor Carrier Safety Administration (FMCSA)). In some embodiments, vehicle data server 104 communicates with compliance event server 108 to receive compliance event data (e.g., citations, safety violations, accident reports, etc.). In some embodiments, vehicle data server 104 comprises a system for a safety score based on compliance and driving. In some embodiments, vehicle data server 104 determines a safety score based on information from compliance event server 108 and vehicle event recorder 102.

Figure 2:
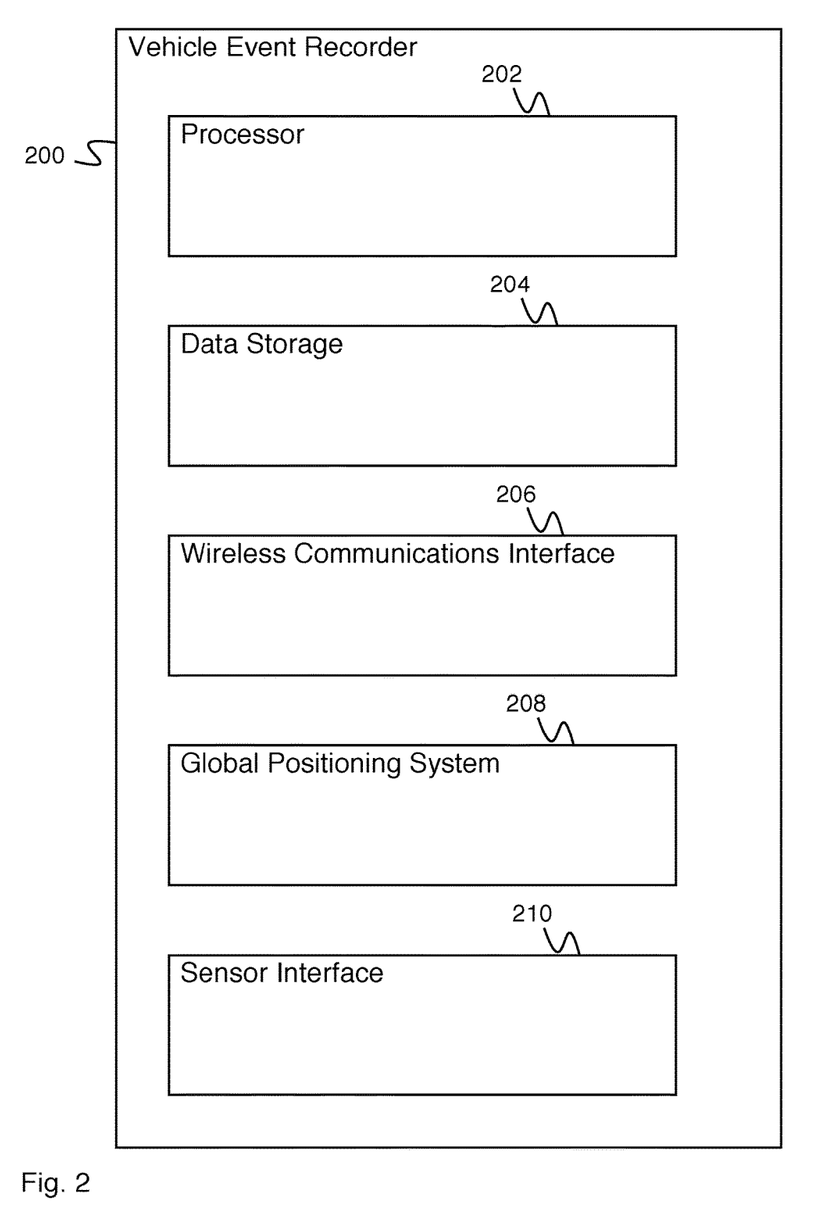
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a global system for mobile communication (GSM) interface, a code division multiple access (CDMA) interface, a WiFi™ interface, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via OBD bus.

Figure 3:
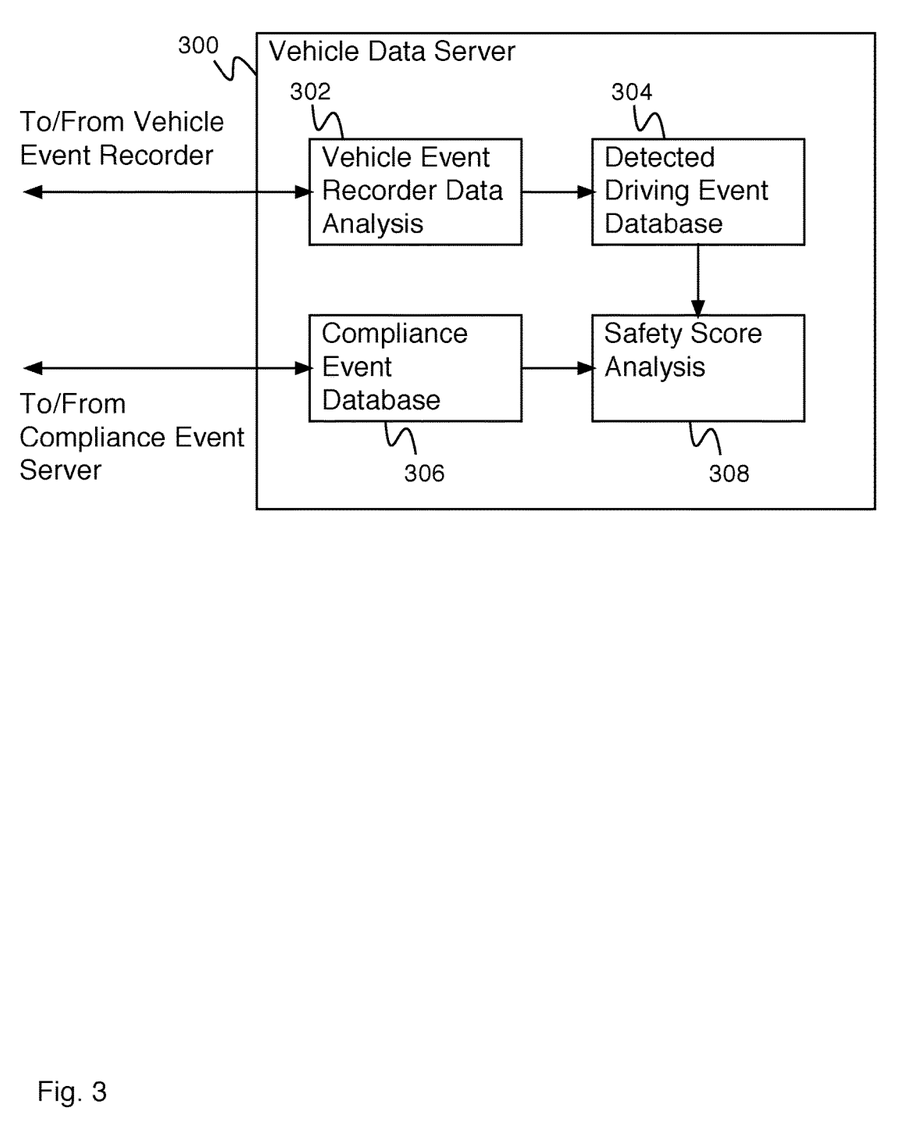
FIG. 3 is a block diagram illustrating an embodiment of a vehicle data server.

FIG. 3 is a block diagram illustrating an embodiment of a vehicle data server. In some embodiments, vehicle data server 300 of FIG. 3 comprises vehicle data server 104 of FIG. 1. In the example shown, vehicle event recorder data analysis 302 communicates with a vehicle event recorder (e.g., vehicle event recorder 102 of FIG. 1) to receive vehicle event data (e.g., vehicle event data describing anomalous events). Vehicle event recorder data analysis 302 analyzes vehicle event data to create detected driving events. In some embodiments, analyzing vehicle event data comprises automated analysis (e.g., data filters, pattern recognition, neural networks, etc.). In some embodiments, analyzing vehicle event data comprises human analysis (e.g., examining event data, watching/listening to event recordings, etc.). In some embodiments, analyzing vehicle event data comprises determining a detected driving event type (e.g., collision, speeding, reckless driving, cell phone usage, etc.) and associated detected driving event data. Detected driving events determined by vehicle event recorder data analysis 302 are stored in detected driving event database 304. In some embodiments, detected driving events are stored in detected driving event database 304 associated with a driver identifier (e.g., a driver's license number, a driver's name and address, a global unique identifier created for the driver, etc.). Compliance event database 306 communicates with a compliance event server (e.g., compliance event server 108 of FIG. 1) to receive compliance events and stores the received compliance events. In various embodiments, compliance events comprise failure to obey traffic control device events, following too close events, brakes events, possession/use/under the influence of alcohol events, operating a CMV (e.g., commercial motor vehicle) without a CDL (e.g., commercial driver's license) events, speeding events, onboard recording device information requirements not met events, inoperative tail lamp events, driver's record of duty status not current events, loose/unfastened tiedown events, brake tubing and hose adequacy events, inoperative turn signal events, ABS (e.g., anti-lock braking system) malfunction events, failure to use seat belt events, no/improper breakaway or emergency braking events, inoperative/defective brakes events, inoperative required lamp events, exhaust leak under truck cab and/or sleeper events, flat tire events, log violation events, improper lane change events, insufficient tire tread events, requiring or permitting driver to driver after 14 hours on duty events, inoperative head lamp events, false report of drivers record of duty status events, no or inadequate driver vehicle inspection report events, 60/70 hour rule violation events, no/discharged/unsecured fire extinguisher events, operating a CMV without periodic inspection events, failing to secure load events, windshields required events, speeding through a work/construction zone events, steering system components worn/welded/missing events, expired medical examiner's certificate events, wheel fasteners loose and/or missing events, flat tire or fabric exposed events, lane restriction violation events, hood not securely fastened events, no pre-trip inspection events, excessive oil leak events, failure to prevent cargo shifting events, unlawfully parking and/or leaving vehicle in the roadway events, glazing permits less than 70 percent of light events, fuel tank fill pipe cap missing events, wheel/rim cracked or broken events, cab door missing/broken events, or any other appropriate compliance events.

In some embodiments, compliance events are stored in compliance event database 306 associated with a driver identifier. In some embodiments, driver identifiers stored associated with events in detected driving event database 304 correspond with driver identifiers stored associated with events in compliance event database 306 (e.g., a driver associated with events in both databases will be represented by the same driver identifier in both databases). Safety score analysis 308 receives detected driving events from detected driving event database 304 and receives compliance events from compliance event database 306 and produces a safety score based on the compliance events and the detected driving events.

Figure 4:
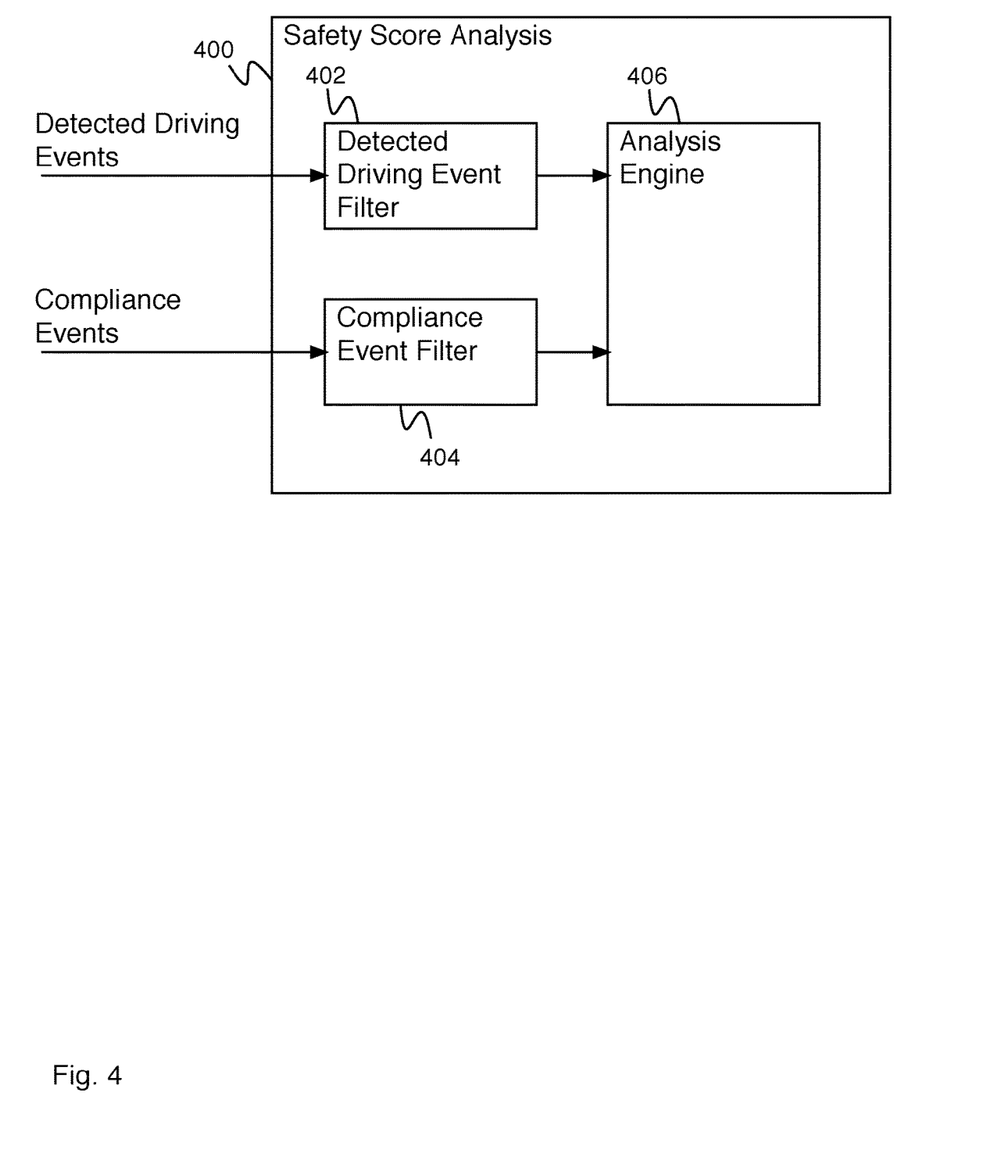
FIG. 4 is a block diagram illustrating an embodiment of a safety score analysis.

FIG. 4 is a block diagram illustrating an embodiment of a safety score analysis. In some embodiments, safety score analysis 400 comprises safety score analysis 308 of FIG. 3. In the example shown, detected driving event filter 402 receives detected driving events (e.g., from a detected driving event database). Detected driving event filter 402 comprises a filter for detected driving events (e.g., some detected driving events are allowed to pass and other detected driving events are dropped). In various embodiments, detected driving event filter 402 filters detected driving events based on event type (e.g., only events of a certain type are allowed to pass), based on event severity (e.g., only severe events, as determined by associated event data, are allowed to pass), based on event timing (e.g., only events that occur within a certain time are allowed to pass, only events that occur near other events are allowed to pass, etc.), or based on any other appropriate criteria. Compliance event filter 404 receives compliance events (e.g., from a compliance event database). Compliance event filter 404 comprises a filter for compliance events. In various embodiments, compliance event filter 404 filters events based on event type, based on event severity, based on event timing, or based on any other appropriate criteria. In some embodiments, the filter criteria for detected driving event filter 402 and for compliance event filter 404 are the same. In some embodiments, the filter criteria for detected driving event filter 402 and for compliance event filter 404 are not the same. Analysis engine 406 comprises an analysis engine for analyzing detected driving events and compliance events and determining a safety score. In some embodiments, analysis engine 406 determines a weighting value for each detected driving event and for each compliance event. In some embodiments, a determined safety score is based at least in part on a sum of weighting values.

Figure 5:
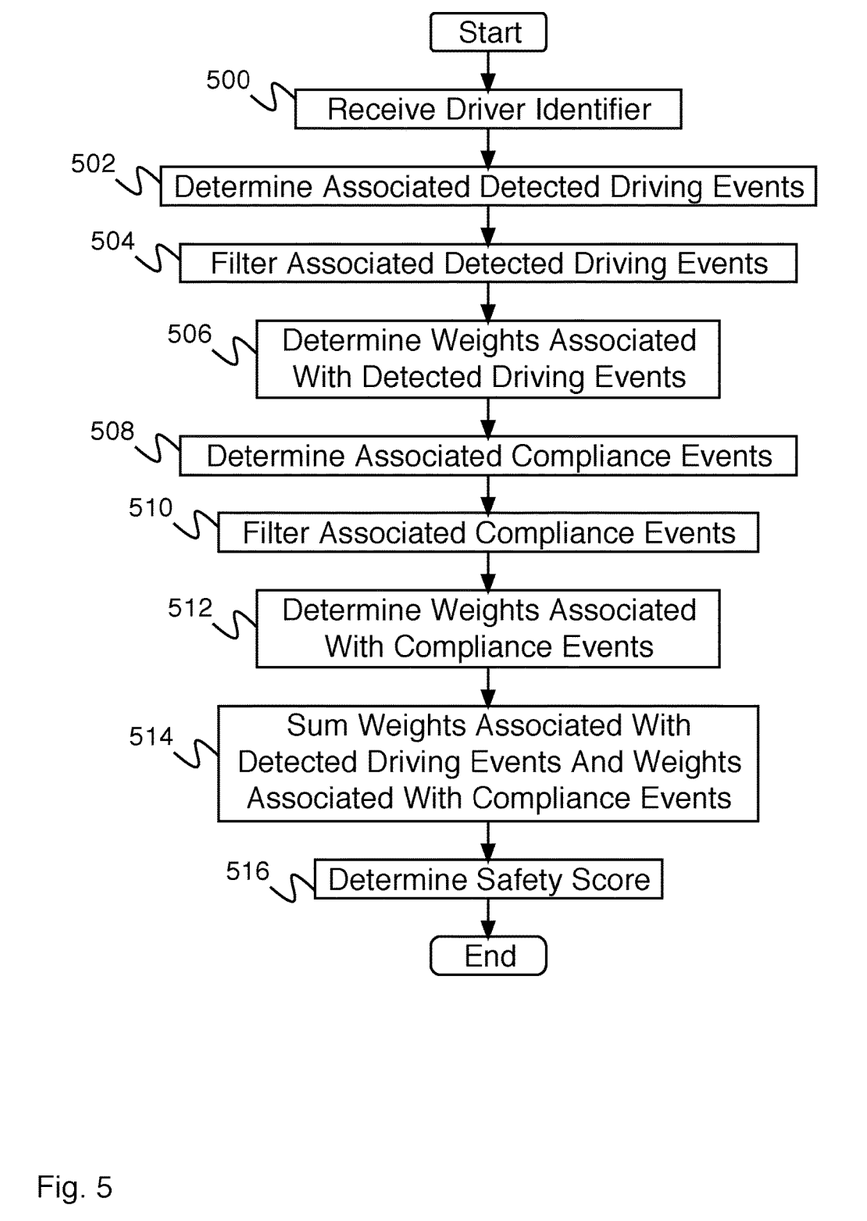
FIG. 5 is a flow diagram illustrating an embodiment of a process for determining a safety score.

FIG. 5 is a flow diagram illustrating an embodiment of a process for determining a safety score. In some embodiments, the process of FIG. 5 is executed by a safety score analysis (e.g., safety score analysis 308 of FIG. 3). In the example shown, in 500, a driver identifier is received. The driver identifier corresponds to the driver that the safety score is to be determined for. In 502, associated detected driving events are determined. In some embodiments, associated detected driving events are determined for the driver associated with the received driver identifier. In 504, associated detected driving events are filtered. In some embodiments, filtering detected driving events comprises removing some detected driving events and keeping others. In some embodiments, all detected driving events are kept. In 506, weights associated with detected driving events are determined. In some embodiments, weights associated with detected driving events are determined by looking up the detected driving events in a detected driving event weight table. In 508, associated compliance events are determined. In some embodiments, associated compliance events are determined for the driver associated with the received driver identifier. In 510, associated compliance events are filtered. In some embodiments, filtering compliance events comprises removing some compliance events and keeping others. In some embodiments, all compliance events are kept. In 512, weights associated with compliance events are determined. In some embodiments, weights associated with compliance events are determined by looking up the compliance events in a compliance event weight table. In some embodiments, weights associated with compliance events are determined by determining a related detected driving event type (e.g., using a detected driving event mapping chart) and determining the weight associated with the related detected driving event type. In 514, the weights associated with the detected driving events and the weights associated with the compliance events are summed. In 516, the safety score is determined. In some embodiments, the safety score comprises the weighted sum determined in 514. In various embodiments, the safety score comprises the weighted sum determined in 514 manipulated by a mathematical function, indexed into a table, or processed in any other appropriate way.

Figure 6:
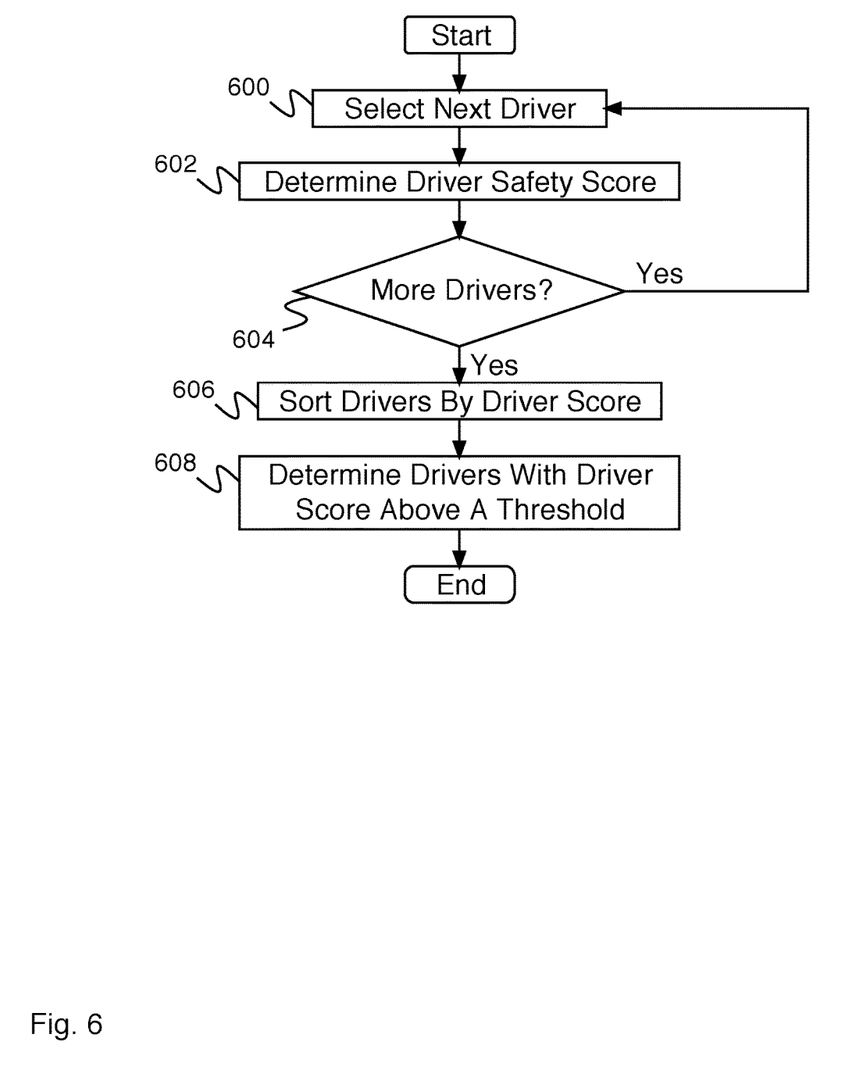
FIG. 6 is a flow diagram illustrating an embodiment of a process for determining a set of unsafe drivers.

FIG. 6 is a flow diagram illustrating an embodiment of a process for determining a set of unsafe drivers. In some embodiments, the process of FIG. 6 is executed by a safety score analysis (e.g., safety score analysis 308 of FIG. 3). In the example shown, in 600, the next driver is selected. In some embodiments, the next driver comprises the first driver. In 602, the driver safety score is determined. In some embodiments, the driver safety score is determined using the process of FIG. 5. In 604, it is determined whether there are more drivers (e.g., drivers for which the driver safety score has not yet been determined). In the event that there are more drivers, control passes to 600. In the event that there are not more drivers, control passes to 606. In 606, the drivers are sorted by safety score (e.g., putting the safest drivers on one end of the list and the least safe drivers on the other end of the list). In 608, drivers with driver score above a threshold are determined. In some embodiments, the drivers with driver score above a threshold comprise a set of unsafe drivers. In some embodiments, the drivers with driver score above a threshold comprise a set of drivers that require coaching.

Figure 7:
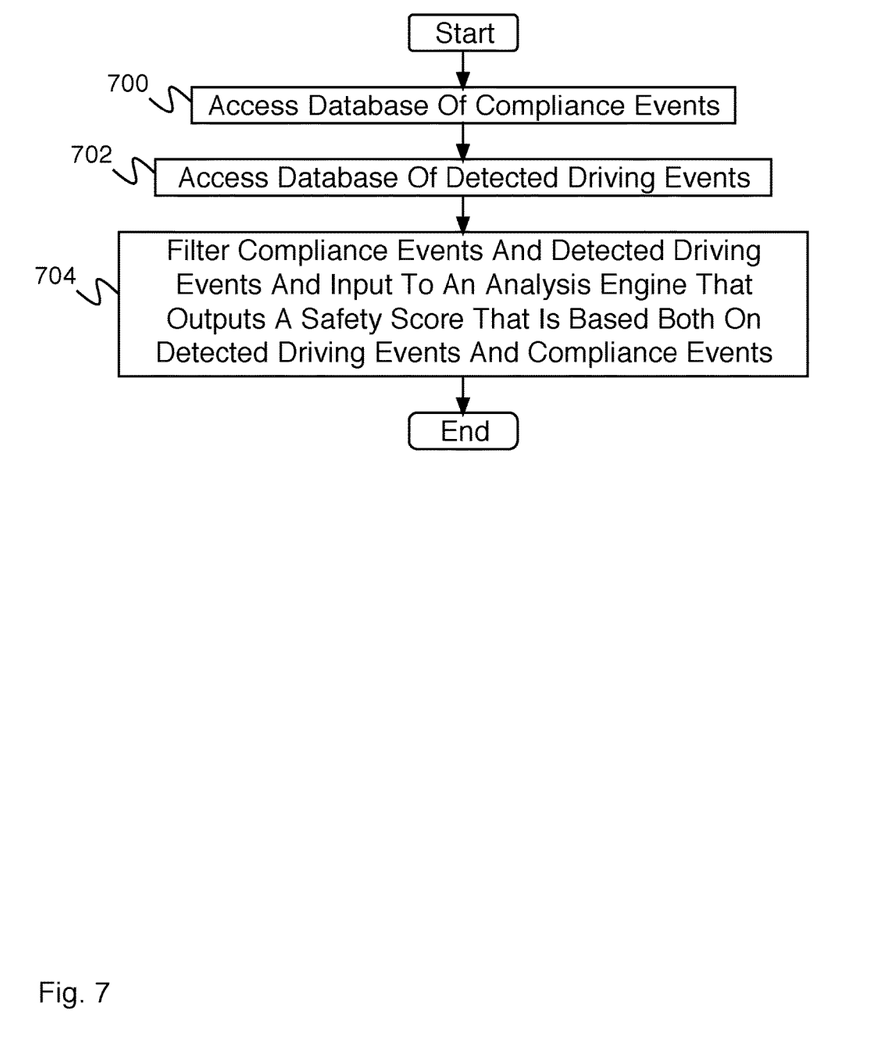
FIG. 7 is a flow diagram illustrating an embodiment of a process for determining a safety score.

FIG. 7 is a flow diagram illustrating an embodiment of a process for determining a safety score. In some embodiments, the process of FIG. 7 is executed by vehicle data server 104 of FIG. 1. In the example shown, in 700, a database of compliance events is accessed. In 702, a database of detected driving events is accessed. In 704, the compliance events and detected driving events are filtered and input to an analysis engine that outputs a safety score that is based both on detected driving events and compliance events.

FIG. 8 is a diagram illustrating an embodiment of a detected driving event weight table. In the example shown, column 800 shows a violation section. Column 802 shows violation description (e.g., Unnecessary delay in HM transportation to destination, Failure to comply with 49 CFR 392.80—Texting while Oper a CMV—Placardable HM, Fail to comply with 392.82—Using a Mobile Phone while Operating a CMV—HM, Operating a CMV while texting, Failure to properly secure parked vehicle, Failure to obey traffic control device, Headlamps—Failing to dim when required, Following too close, Improper lane change, Lane Restriction violation, Improper passing, Unlawfully parking and/or leaving vehicle in the roadway, Reckless driving, Railroad Grade Crossing violation, Speeding—Speeding 1-5 miles per hour over the speed limit, State/Local Laws—Speeding 6-10 miles per hour over the speed limit, State/Local Laws—Speeding 11-14 miles per hour over the speed limit, State/Local Laws—Speeding 15 or more miles per hour over the speed limit, State/Local Laws—Speeding work/construction zone, State/Local Laws—Operating a CMV while texting, Improper turns, Failure to yield right of way, Scheduling run to necessitate speeding, Failing to stop at railroad crossing—bus, Failing to stop at railroad crossing—chlorine, Failing to stop at railroad crossing—placard, Failing to stop at railroad crossing—Cargo Tank, Failed to use caution for hazardous condition, Failing to use hazard warning flashers, Unauthorized passenger on board CMV, Unsafe bus operations, Bus—Standees forward of the standee line, Using or equipping a CMV with radar detector, Driving a CMV while Texting, Using a hand-held mobile telephone while operating a CMV, Allowing or requiring driver to use a hand-held mobile telephone while operating a CMV, State/local laws ordinance regulations, Smoking within 25 feet of HM vehicle, Driving a vehicle to transport migrant workers in noncompliance with part 398, etc.). Column 804 shows violation group description (e.g., 'HM Related', Texting', 'Phone Call', 'Other Driver Violations', 'Dangerous Driving', 'Miscellaneous violations', 'Reckless Driving', 'Speeding Related', 'Speeding 1', 'Speeding 2', 'Speeding 3', 'Speeding 4', etc.). Column 806 shows violation severity weight (e.g., a '1', '10', '5', '3', '4', '7', '2', '6', '8', '9', etc.). Column 808 shows DriveCam capture status (e.g., a 'Y' or a 'N').

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for determining a safety score, comprising a processor configured to:
  determine driving events associated with a driver, wherein the driving events are detected using a set of sensors, the set of sensors including a video recorder, an audio recorder, an accelerometer, a gyroscope, a vehicle state sensor, a Global Positioning System (GPS), an outdoor temperature sensor, a moisture sensor, a laser line tracker sensor, or any combination thereof, wherein the determining of the driving events comprises to:
    analyze vehicle event data to create the driving events, the vehicle event data being generated by the set of sensors, the analyzing of the vehicle event data including to filter the vehicle event data to obtain a driving event, perform pattern recognition of the vehicle event data to obtain a driving event, use neural networks on the vehicle event data to obtain a driving event, or any combination thereof;
  filter compliance events including a violation of a work shift regulation associated with the driver, the filtering including:
    determining whether a first compliance event matches a filtered compliance event, wherein the filtered compliance event relates to an event type, an event severity, an event timing, or any combination thereof; and in the event that the first compliance event matches the filtered compliance event, adding the first compliance event to a filtered list of events;
filter the driving events associated with the driver, the filtering including:
determining whether a first detected driving event matches a filtered driving event, wherein the filtered driving event relates to an event type, an event severity, an event timing, or any combination thereof; and
in the event that the first detected driving event matches the filtered driving event, adding the first detected driving event to the filtered list of events;
determine a safety score associated with the driver based at least in part on the filtered list of events, comprising to:
weigh a first event from the filtered list of events by a first weight to obtain a first weighted event;
weigh a second event from the filtered list of events by a second weight to obtain a second weighted event; and
combine the first weighted event and the second weighted event to obtain the safety score;
in the event that the safety score exceeds a predetermined threshold, determine that the driver is to be placed in a set of unsafe drivers that require coaching; and
output a recommendation based on the determination that the driver is to be placed in a set of unsafe drivers that require coaching.

2. The system of claim 1, wherein one or more of the driving events comprises a collision event.

3. The system of claim 1, wherein one or more of the driving events comprises a risky driving behavior.

4. The system of claim 3, wherein the risky driving behavior comprises one or more of the following: speeding, reckless driving, cell phone use, texting, food and/or drink distractions, passenger distractions, non-cell phone electronic device distractions, not recognizing traffic conditions ahead, not properly scanning an intersection or roadway, not checking mirrors, following too close to a lead vehicle, falling asleep, drowsy driving, aggressive driving, and failure to obey a traffic control device.

5. The system of claim 3, wherein the risky driving behavior comprises one or more of the following: hard braking, negotiating a corner or curve too fast, and rapid acceleration.

6. The system of claim 1, further comprising an output interface configured to provide a list of drivers and associated safety scores.

7. The system of claim 6, wherein the list of drivers is sorted by safety score.

8. The system of claim 6, wherein the list of drivers comprises a list of unsafe drivers.

9. The system of claim 6, wherein the list of drivers comprises a list of drivers requiring training.

10. The system of claim 1, wherein determining a weight associated with each detected driving event comprises looking up each driving event in a driving event weight table.

11. The system of claim 1, wherein determining a weight associated with each compliance event comprises looking up each compliance event in a compliance event weight table.

12. The system of claim 1, wherein determining a weight associated with each compliance event comprises determining a related detected driving event type and determining a weight associated with the related detected driving event type.

13. A method for determining a safety score, comprising:
determining driving events associated with a driver, wherein the driving events are detected using a set of sensors, the set of sensors including a video recorder, an audio recorder, an accelerometer, a gyroscope, a vehicle state sensor, a Global Positioning System (GPS), an outdoor temperature sensor, a moisture sensor, a laser line tracker sensor, or any combination thereof, wherein the determining of the driving events comprises:
analyzing vehicle event data to create the driving events, the vehicle event data being generated by the set of sensors, the analyzing of the vehicle event data including filtering the vehicle event data to obtain a driving event, performing pattern recognition of the vehicle event data to obtain a driving event, using neural networks on the vehicle event data to obtain a driving event, or any combination thereof;
filtering, using a processor, compliance events, including a violation of a work shift regulation associated with the driver, the filtering including:
determining whether a first compliance event matches a filtered compliance event, wherein the filtered compliance event relates to an event type, an event severity, an event timing, or any combination thereof; and
in the event that the first compliance event matches the filtered compliance event, adding the first compliance event to a filtered list of events;
filtering the driving events associated with the driver, the filtering including:
determining whether a first detected driving event matches a filtered driving event, wherein the filtered driving event relates to an event type, an event severity, an event timing, or any combination thereof; and
in the event that the first detected driving event matches the filtered driving event, adding the first detected driving event to the filtered list of events;
determining a safety score associated with the driver based at least in part on the filtered list of events, comprising:
weighing a first event from the filtered list of events by a first weight to obtain a first weighted event;
weighing a second event from the filtered list of events by a second weight to obtain a second weighted event; and
combining the first weighted event and the second weighted event to obtain the safety score;
in the event that the safety score exceeds a predetermined threshold, determining that the driver is to be placed in a set of unsafe drivers that require coaching; and
outputting a recommendation based on at least one of: the determination that the driver is to be placed in a set of unsafe drivers that require coaching.

14. A computer program product for determining a safety score, the computer program product being embodied in a tangible non-transitory computer readable storage medium and comprising computer instructions for:
determining driving events associated with a driver, wherein the driving events are detected using a set of sensors, the set of sensors including a video recorder, an audio recorder, an accelerometer, a gyroscope, a vehicle state sensor, a Global Positioning System (GPS), an outdoor temperature sensor, a moisture sensor, a laser line tracker sensor, or any combination thereof, wherein the determining of the driving events comprises:

analyzing vehicle event data to create the driving events, the vehicle event data being generated by the set of sensors, the analyzing of the vehicle event data including filtering the vehicle event data to obtain a driving event, performing pattern recognition of the vehicle event data to obtain a driving event, using neural networks on the vehicle event data to obtain a driving event, or any combination thereof;

filtering compliance events, including a violation of a work shift regulation associated with the driver, the filtering including:
  determining whether a first compliance event matches a filtered compliance event, wherein the filtered compliance event relates to an event type, an event severity, an event timing, or any combination thereof; and
  in the event that the first compliance event matches the filtered compliance event, adding the first compliance event to a filtered list of events;

filtering the driving events associated with the driver, the filtering including:
  determining whether a first detected driving event matches a filtered driving event, wherein the filtered driving event relates to an event type, an event severity, an event timing, or any combination thereof; and
  in the event that the first detected driving event matches the filtered driving event, adding the first detected driving event to the filtered list of events;

determining a safety score associated with the driver based at least in part on the filtered list of events, comprising:
  weighing a first event from the filtered list of events by a first weight to obtain a first weighted event;
  weighing a second event from the filtered list of events by a second weight to obtain a second weighted event; and
  combining the first weighted event and the second weighted event to obtain the safety score;

in the event that the safety score exceeds a predetermined threshold, determining that the driver is to be placed in a set of unsafe drivers that require coaching; and outputting a recommendation based on the determination that the driver is to be placed in a set of unsafe drivers that require coaching.

15. The system of claim 1, wherein a compliance event includes a violation of a legal regulation.

16. The system of claim 1, wherein the work shift regulation includes being on duty over a threshold length of time.

17. The system of claim 1, wherein the violation of a work shift regulation includes a failure to maintain a vehicle, wherein the failure to maintain a vehicle includes failing to maintain cargo of the vehicle in accordance with maintenance regulations.

18. The system of claim 1, wherein the violation of a work shift regulation is a violation reported by a law-enforcement agency.

19. The system of claim 1, further comprising an input interface configured to:
  receive the compliance events from a database of compliance events of a compliance event server; and
  receive the driving events from a database of detected driving events, wherein the driving events are based at least in part on sensor-captured data received from a vehicle event recorder, wherein the vehicle event recorder comprises a processor and an external video camera.

* * * * *